(12) United States Patent
Burglin et al.

(10) Patent No.: US 12,093,418 B2
(45) Date of Patent: *Sep. 17, 2024

(54) SYSTEMS AND METHODS FOR BLOCKCHAIN WALLET OWNER VERIFICATION AND ACCESS MANAGEMENT

(71) Applicant: AnonyDoxx, LLC, Savannah, GA (US)

(72) Inventors: Jonah Burglin, Savannah, GA (US); Jordan Burglin, Phoenix, AZ (US)

(73) Assignee: ANONYDOXX, LLC, Savannah, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/429,740

(22) Filed: Feb. 1, 2024

(65) Prior Publication Data
US 2024/0232413 A1 Jul. 11, 2024

Related U.S. Application Data

(63) Continuation of application No. 18/475,653, filed on Sep. 27, 2023.
(Continued)

(51) Int. Cl.
*G06Q 20/36* (2012.01)
*G06F 21/45* (2013.01)
(Continued)

(52) U.S. Cl.
CPC ........ *G06F 21/6218* (2013.01); *G06F 21/602* (2013.01); *G06Q 20/3674* (2013.01);
(Continued)

(58) Field of Classification Search
None
See application file for complete search history.

(56) References Cited

U.S. PATENT DOCUMENTS

2015/0287026 A1 10/2015 Yang
2017/0046651 A1 2/2017 Lin
(Continued)

OTHER PUBLICATIONS

Blockchain-Based Identity Management System and Self-Sovereign Identity Ecosystem: A Comprehensive Survey. Ahmed et al. IEEE. (Year: 2022).*
(Continued)

*Primary Examiner* — Venkat Perungavoor
(74) *Attorney, Agent, or Firm* — Carter, DeLuca & Farrell LLP

(57) ABSTRACT

A central system includes processor(s) and a memory storing instructions. The instructions, when executed by the processor(s), cause the central system to: store blockchain wallet addresses for blockchain wallets; store a verification status of each blockchain wallet, where each verification status indicates whether the owner identity of the respective blockchain wallet has been verified; and provide access management for client systems. The access management includes, for each client system: associating a subset of the blockchain wallets with the client system, where the subset contains blockchain wallets that are enrolled with the client system, and storing an access permission for each enrolled blockchain wallet for the client system. The central system, in response to a request from a particular client system regarding a particular blockchain wallet, communicates, to the particular client system, the access permission for the particular blockchain wallet for the particular client system.

12 Claims, 11 Drawing Sheets

Related U.S. Application Data

(60) Provisional application No. 63/438,024, filed on Jan. 10, 2023.

(51) Int. Cl.
  *G06F 21/60* (2013.01)
  *G06F 21/62* (2013.01)
  *G06Q 20/40* (2012.01)
  *G06F 21/31* (2013.01)
  *G06Q 20/38* (2012.01)
  *G06Q 40/04* (2012.01)

(52) U.S. Cl.
  CPC ..... *G06Q 20/3829* (2013.01); *G06Q 20/4014* (2013.01); *G06Q 40/04* (2013.01)

(56) References Cited

U.S. PATENT DOCUMENTS

| | | |
|---|---|---|
| 2017/0286951 A1 | 10/2017 | Ignatchenko |
| 2018/0130050 A1 | 5/2018 | Taylor |
| 2018/0293557 A1 | 10/2018 | Kim |
| 2020/0226285 A1 | 7/2020 | Bulleit |
| 2021/0243193 A1 | 8/2021 | Padmanabhan |
| 2021/0319436 A1 | 10/2021 | Ow |
| 2021/0383363 A1 | 12/2021 | Smirnov |
| 2021/0390196 A1 | 12/2021 | Lavine |
| 2022/0114580 A1 | 4/2022 | Gopireddy |
| 2023/0036724 A1 | 2/2023 | Khalfan |
| 2023/0114586 A1 | 4/2023 | Agrawal |
| 2023/0298023 A1 | 9/2023 | Zhou |
| 2023/0336361 A1* | 10/2023 | Cárdenes Cabré ... H04L 9/3247 |
| 2023/0359604 A1 | 11/2023 | Doney |

OTHER PUBLICATIONS

Blockchain-Based Decentralized Digital Self-Sovereign Identity Wallet for Secure Transaction . Islam et al. ASTESJ. (Year: 2021).*

Han, J. et al., "An Efficient Multi-signature Wallet in Blockchain Using Bloom Filter" ACM (Mar. 2021) pp. 273-281.

Islam, T. et al., "Blockchain-Based Decentralized Digital Self-Sovereign Identity Wallet for Secure Transaction" Astes (Apr. 2021) pp. 977-983, vol. 6, No. 2.

Sun, N. et al., "A Privacy-Preserving KYC-Compliant Identity Scheme for Accounts on All Public Blockchains" MDPI (Nov. 2022) pp. 1-18, vol. 14, No. 14584.

Yang, C. et al., "AuthPrivacyChain: A Blockchain-Based Access Control Framework With Privacy Protection in Cloud" IEEE (Apr. 2020) pp. 70604-70615, vol. 8.

International Search Report and Written Opinion issued in corresponding International Application No. PCT/US23/75213 dated Feb. 2, 2024, pp. 1-9.

* cited by examiner

Client Portal  Home  Wallets  Admin  ◎ 0x...a80a

| Connected Wallets — 610 | Verified Wallets — 620 | Admin Wallets — 630 |
|---|---|---|
| 8 | 5 | 5 |

Name
ValidEntry
Contact
Jonah
Website
https://anonydoxx.network

Latest Wallets
0x72F0A3657f170860D05a69C44D7b68F8C2c69d4
0x3E41eFAE7dCE0A3c7985B6F73292d1F1A622e572
0x5FbAf023B8d3D05E7e1f3051F1046A259d21400F   Connected: December 15, 2022
0x5FbAf023B8d3D05E7e1f3051F1046A259d21400F   Connected: December 15, 2022
0x94D57458B1c527b16aDbF7b5cB87F4A2f70B35e    Connected: December 15, 2022
                                              Connected: December 15, 2022
                                              Connected: December 15, 2022

Admin Wallets — 640
0x85C24FF8F31752871a6BF68D5424C05F0780561
0xC3109B958C938517Af690916eAD5eAec34765a48
0xAc1037895D9Cf59e37177A5d79Ac1287ADd65176
0x348C18c0129F2848dFd6d5C66c0EBEfd39Bc8208
0x81A5597FA6909bA580995e525BA383BfF439a80a

FIG. 6

Vault Verification

Get Verified

First Name
[First Name]
Last Name
[Last Name]
Email
[Email Address]
Country of Residence
[ ⌄ ]
Project Name
[Project Name]
☐ I agree to Terms of Use.
☐ I agree to Privacy Policy.

[Get Started]

FIG. 8

SYSTEMS AND METHODS FOR BLOCKCHAIN WALLET OWNER VERIFICATION AND ACCESS MANAGEMENT

CROSS-REFERENCE TO RELATED APPLICATIONS

The present application is a Continuation Application of U.S. patent application Ser. No. 18/475,653, filed on Sep. 27, 2023, and claims priority to and the benefit of the filing date of U.S. Provisional Application No. 63/438,024, filed Jan. 10, 2023, which applications are hereby incorporated by reference in their entirety.

TECHNICAL FIELD

The present disclosure relates generally to the field of blockchain wallets and, more particularly, to verifying the identities of blockchain wallet owners.

BACKGROUND

Blockchain wallets have gained greater adoption as digital transactions and cryptocurrencies have become more widespread. The owner of a blockchain wallet does not need to be revealed for the wallet to be used for a transaction. A benefit of not revealing owner information is that personal information may be protected and risk of identity fraud may be reduced. On the other hand, for services or platforms that use blockchain wallets for transactions, there may be risk to the service or platform provider in not knowing the owner of the digital wallet, such as risk of enabling money laundering.

SUMMARY

The present disclosure relates to verifying the identities of blockchain wallet owners in a manner that protects the personal information of blockchain wallet owners while providing a degree of assurance to service or platform providers that the identities of blockchain wallet owners have been verified. Additionally, aspects of the present disclosure maintain a separate access permission for each blockchain wallet for each provider, such that a blockchain wallet may be granted access to one provider but denied access to another provider, even if the owner identity for the blockchain wallet is verified. The technology of the present disclosure may enable service or platform providers to meet Know-Your-Customer (KYC) government regulations without verifying identity information by themselves.

In accordance with aspects of this disclosure, a central system includes one or more electronic storage, one or more processors, and at least one memory storing instructions. The instructions, when executed by the one or more processors, cause the central system to: store, in the one or more electronic storage, blockchain wallet addresses for a plurality of blockchain wallets; store, in the one or more electronic storage, a verification status of each blockchain wallet of the plurality of blockchain wallets, where for each blockchain wallet of the plurality of blockchain wallets, the respective verification status indicates whether identity of an owner of the respective blockchain wallet has been verified; and provide access management for a plurality of client systems. The access management includes, for each client system of the plurality of client systems: associating a respective subset of the plurality of blockchain wallets with the respective client system, where the respective subset contains blockchain wallets of the plurality of blockchain wallets that are enrolled with the respective client system, and storing, in the one or more electronic storage, an access permission for each enrolled blockchain wallet of the respective subset for the respective client system, where each access permission is based on at least the respective verification status of the respective enrolled blockchain wallet. The central system, in response to a request from a particular client system of the plurality of client systems regarding a particular blockchain wallet of the plurality of blockchain wallets, communicates, to the particular client system, the access permission for the particular blockchain wallet for the particular client system.

In various embodiments of the central system: the verification status of the particular blockchain wallet indicates that the identity of the owner of the particular blockchain wallet has been verified; for a first client system among the multiple client systems, the access permission for the particular blockchain wallet for the first client system indicates that access is granted; and for a second client system among the multiple client systems, the access permission for the particular enrolled blockchain wallet for the second client system indicates that access is denied.

In various embodiments of the central system, in providing the access management, the instructions, when executed by the one or more processors, further cause the central system to: receive a concurrent request from the first client system regarding the particular blockchain wallet and a concurrent request from the second client system regarding the particular blockchain wallet; in response to the concurrent request from the first client system regarding the particular blockchain wallet, communicate, to the first client system, that access is granted; and in response to the concurrent request from the second client system regarding the particular blockchain wallet, communicate, to the second client system, that access is denied.

In various embodiments of the central system, in providing the access management, the instructions, when executed by the one or more processors, further cause the central system to, for each client system of the plurality of client systems: automatically set, based on respective configurable criteria for the respective client system and without human intervention, the access permission for any enrolled blockchain wallet of the respective subset for the respective client system.

In various embodiments of the central system, in providing the access management, the instructions, when executed by the one or more processors, further cause the central system to, for each client system of the plurality of client systems: permit a client administrator of the respective client system to manually set the access permission for any enrolled blockchain wallet of the respective subset for the respective client system to a denied state.

In accordance with aspects of the present disclosure, a computer-implemented method includes: storing, in one or more electronic storage, blockchain wallet addresses for a plurality of blockchain wallets; storing, in the one or more electronic storage, a verification status of each blockchain wallet of the plurality of blockchain wallets, where for each blockchain wallet of the plurality of blockchain wallets, the respective verification status indicates whether identity of an owner of the respective blockchain wallet has been verified; and providing access management for a plurality of client systems. The access management includes, for each client system of the plurality of client systems: associating a respective subset of the plurality of blockchain wallets with the respective client system, where the respective subset contains blockchain wallets of the plurality of blockchain wallets that are enrolled with the respective client system, and storing, in the one or more electronic storage, an access permission for each enrolled blockchain wallet of the respective subset for the respective client system, where each access permission is based on at least the respective verification status of the respective enrolled blockchain wallet. The computer-implemented method includes, in response to a request from a particular client system of the plurality of client systems regarding a particular blockchain wallet of the plurality of blockchain wallets, communicating, to the particular client system, the access permission for the particular blockchain wallet for the particular client system.

In various embodiments of the computer-implemented method: the verification status of the particular blockchain wallet indicates that the identity of the owner of the particular blockchain wallet has been verified; for a first client system among the multiple client systems, the access permission for the particular blockchain wallet for the first client system indicates that access is granted; and for a second client system among the multiple client systems, the access permission for the particular enrolled blockchain wallet for the second client system indicates that access is denied.

In various embodiments of the computer-implemented method, providing the access management further includes: receiving a concurrent request from the first client system regarding the particular blockchain wallet and a concurrent request from the second client system regarding the particular blockchain wallet; in response to the concurrent request from the first client system regarding the particular blockchain wallet, communicating, to the first client system, that access is granted; and in response to the concurrent request from the second client system regarding the particular blockchain wallet, communicating, to the second client system, that access is denied.

In various embodiments of the computer-implemented method, providing the access management further includes, for each client system of the plurality of client systems: automatically setting, based on respective configurable criteria for the respective client system and without human intervention, the access permission for any enrolled blockchain wallet of the respective subset for the respective client system.

In various embodiments of the computer-implemented method, providing the access management further includes, for each client system of the plurality of client systems: permitting a client administrator of the respective client system to manually set the access permission for any enrolled blockchain wallet of the respective subset for the respective client system to a denied state.

In accordance with aspects of the present disclosure, a non-transitory computer-readable medium stores instructions. The instructions, when executed by one or more processors of a central system, causes the central system to: store, in one or more electronic storage, blockchain wallet addresses for a plurality of blockchain wallets; store, in the one or more electronic storage, a verification status of each blockchain wallet of the plurality of blockchain wallets, where for each blockchain wallet of the plurality of blockchain wallets, the respective verification status indicates whether identity of an owner of the respective blockchain wallet has been verified; and provide access management for a plurality of client systems. The access management includes, for each client system of the plurality of client systems: associating a respective subset of the plurality of blockchain wallets with the respective client system, where the respective subset contains blockchain wallets of the plurality of blockchain wallets that are enrolled with the respective client system, and storing, in the one or more electronic storage, an access permission for each enrolled blockchain wallet of the respective subset for the respective client system, where each access permission is based on at least the respective verification status of the respective enrolled blockchain wallet. The instructions, when executed, causes the central system to, in response to a request from a particular client system of the plurality of client systems regarding a particular blockchain wallet of the plurality of blockchain wallets, communicate, to the particular client system, the access permission for the particular blockchain wallet for the particular client system.

In various embodiments of the non-transitory computer-readable medium: the verification status of the particular blockchain wallet indicates that the identity of the owner of the particular blockchain wallet has been verified; for a first client system among the multiple client systems, the access permission for the particular blockchain wallet for the first client system indicates that access is granted; and for a second client system among the multiple client systems, the access permission for the particular enrolled blockchain wallet for the second client system indicates that access is denied.

In various embodiments of the non-transitory computer-readable medium, in providing the access management, the instructions, when executed by the one or more processors, further cause the central system to: receive a concurrent request from the first client system regarding the particular blockchain wallet and a concurrent request from the second client system regarding the particular blockchain wallet; in response to the concurrent request from the first client system regarding the particular blockchain wallet, communicate, to the first client system, that access is granted; and in response to the concurrent request from the second client system regarding the particular blockchain wallet, communicate, to the second client system, that access is denied.

In various embodiments of the non-transitory computer-readable medium, in providing the access management, the instructions, when executed by the one or more processors, further cause the central system to, for each client system of the plurality of client systems: automatically set, based on respective configurable criteria for the respective client system and without human intervention, the access permission for any enrolled blockchain wallet of the respective subset for the respective client system.

In various embodiments of the non-transitory computer-readable medium, in providing the access management, the instructions, when executed by the one or more processors, further cause the central system to, for each client system of the plurality of client systems: permit a client administrator of the respective client system to manually set the access permission for any enrolled blockchain wallet of the respective subset for the respective client system to a denied state.

The details of one or more embodiments of the disclosure are set forth in the accompanying drawings and the description below. Other features, objects, and advantages of the techniques described in this disclosure will be apparent from the description and drawings, and from the claims.

BRIEF DESCRIPTION OF THE DRAWINGS

A detailed description of embodiments of the disclosure will be made with reference to the accompanying drawings, wherein like numerals designate corresponding parts in the figures:

FIG. 6 is a diagram of an example application screen accessible by a central system administrator, in accordance with aspects of the present disclosure;

FIG. 8 is a diagram of an example application screen accessible by a user for verifying a blockchain wallet address, in accordance with aspects of the present disclosure;

Figure 1:
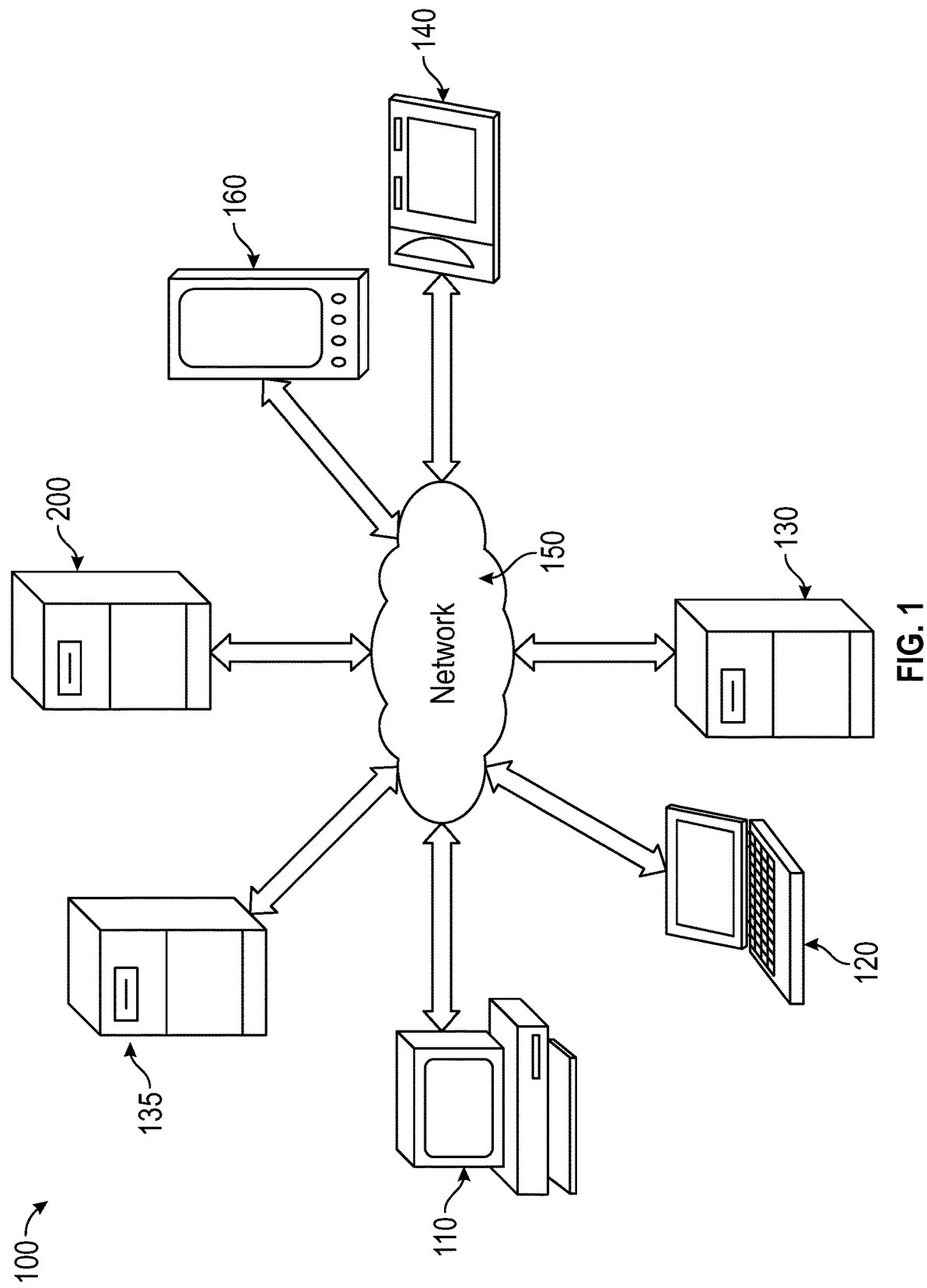
FIG. 1 is a diagram of an example of a networked environment in which a central system services multiple client systems, in accordance with aspects of the present disclosure.

Further details and aspects of exemplary aspects of the disclosure are described in more detail below with reference to the appended figures. Any of the above aspects and aspects of this disclosure may be combined without departing from the scope of the disclosure.

DETAILED DESCRIPTION

The present disclosure relates to verifying the identities of blockchain wallet owners in a manner that protects the personal information of blockchain wallet owners while providing a degree of assurance to service or platform providers that the identities of blockchain wallet owners have been verified. Additionally, aspects of the present disclosure maintain a separate access permission for each blockchain wallet for each provider, such that a blockchain wallet may be granted access to one provider but denied access to another provider, even if the owner identity for the blockchain wallet is verified. The technology of the present disclosure may enable service or platform providers to meet Know-Your-Customer(KYC) government regulations without verifying identity information by themselves.

Although this disclosure will be described in terms of specific aspects, it will be readily apparent to those skilled in this art that various modifications, rearrangements, and substitutions may be made without departing from the spirit of this disclosure.

For purposes of promoting an understanding of the principles of this disclosure, reference will now be made to exemplary aspects illustrated in the drawings, and specific language will be used to describe the same. It will nevertheless be understood that no limitation of the scope of this disclosure is thereby intended. Any alterations and further modifications of the inventive features illustrated herein, and any additional applications of the principles of this disclosure, as illustrated herein, which would occur to one skilled in the relevant art and having possession of this disclosure, are to be considered within the scope of this disclosure.

FIG. 1 shows an example of a networked environment 100 by which a central system 200 provides services to multiple client systems 130, 135 that operate using blockchain wallets. The networked environment 100 includes various user devices, which may include a desktop computer 110, a laptop 120, a tablet 140, and/or a smartphone 160, among other types of user devices. The systems and user devices communicate with each other over a network 150. As persons skilled in the art will understand, the network 150 is illustrated for simplicity and may, in actuality, include multiple wired or wireless networks that utilize technologies such as Wi-Fi, Ethernet, Internet Protocol, 4G, and/or 5G, among other communication technologies. For example, the network 150 may include, but is not limited to, a cellular network, residential broadband, satellite communications, an intranet, and/or the Internet, among other networks.

In accordance with aspects of the present disclosure, the central system 200 provides identity verification services for blockchain wallets. As persons skilled in the art will understand, a blockchain wallet is a digital account that includes a public key and a private key which enable transactions on a blockchain, such as transactions for exchanging cryptocurrency. The public key is used by others to transact with the owner of the blockchain wallet, and the private key is used by the owner of the wallet to transact with others. A blockchain wallet has one or more addresses that reflect the public key. The address of a blockchain wallet for one blockchain may be different from the address of the blockchain wallet for a separate blockchain. The address of a blockchain wallet is provided to others to enable others to perform a blockchain transaction with the owner of the blockchain wallet.

As mentioned above, a blockchain transaction may be performed using a blockchain wallet address without knowing the identity of the owner of the blockchain wallet. Such transactions may subject a service or platform provider, such as client system 130 or client system 135, to risks. In accordance with aspects of the present disclosure, the central system 200 provides services to the client systems 130, 135 for verifying the identity of a blockchain wallet owner. Such services will be described in more detail in connection with FIGS. 4 and 7-9.

In accordance with aspects of the present disclosure, the client systems 130, 135 operate with blockchain wallet addresses, and the central system 200 also provides access permission services for blockchain wallets that are enrolled with the client systems 130, 135. The client systems 130, 135 may, for example, provide cryptocurrency exchanges and/or other services that are based on a blockchain. The blockchain wallet addresses that are enrolled with one client system 130 may or may not overlap with the blockchain wallet addresses that are enrolled with another client system, such as client system 135. In accordance with aspects of the present disclosure, the central system 200 maintains separate access permissions for a blockchain wallet address that is enrolled with multiple client systems, such as a separate access permission for client system 130 for the blockchain wallet address and a separate access permission for client system 135 for the same blockchain wallet address. The access permission services will be described in more detail in connection with FIGS. 5, 10, and 11.

In FIG. 1, the user devices 110, 120, 140, 160 communicate with the client systems 130, 135 to use their services, which may be cryptocurrency exchange services and/or other services based on a blockchain, as mentioned above. Users may use the client systems 130, 135 via an application. The term "application" may include a computer program designed to perform particular functions, tasks, or activities. Application may refer to, for example, software running locally or remotely, software running as a stand-alone program, software running in a web browser, and/or other software which would be understood by one skilled in the art to be an application. An application may run on the central system 200, on the client systems 130, 135, and/or on a user device 110, 120, 140, 160.

The users of the client systems 130, 135 enroll blockchain wallets with the client systems 130, 135. In accordance with aspects of the present disclosure, the client systems 130, 135 may redirect its users to the central system 200 to perform owner identity verification, and additionally, each client system 130, 135 may query the central system 200 to determine whether a blockchain wallet has access permission to access the client system's services. Such operations will be described in more detail in connection with FIGS. 4-11. Having the central system 200 perform identify verification for a blockchain wallet has several benefits. For example, the identity information for an owner of a blockchain wallet is stored in one location (the central system 200) rather than on multiple client systems 130, 135, which reduces the risk of identity theft for the blockchain wallet owner. The client systems 130, 135 also benefit from not having to store and protect identity information but still having assurances that blockchain wallets using the client systems 130, 135 are verified by the central system 200. In this manner, the client systems 130, 135 may satisfy government regulations, such as Know-Your-Customer (KYC) government regulations, without having to verify owner identities by themselves.

The networked environment 100 and the number of systems and devices illustrated in FIG. 1 are merely an example. In actuality, the central system 200 may provide services to many more client systems, and the client systems may provide their services to many more user devices. Such networked environments are all contemplated to be within the scope of the present disclosure.

Figure 2:
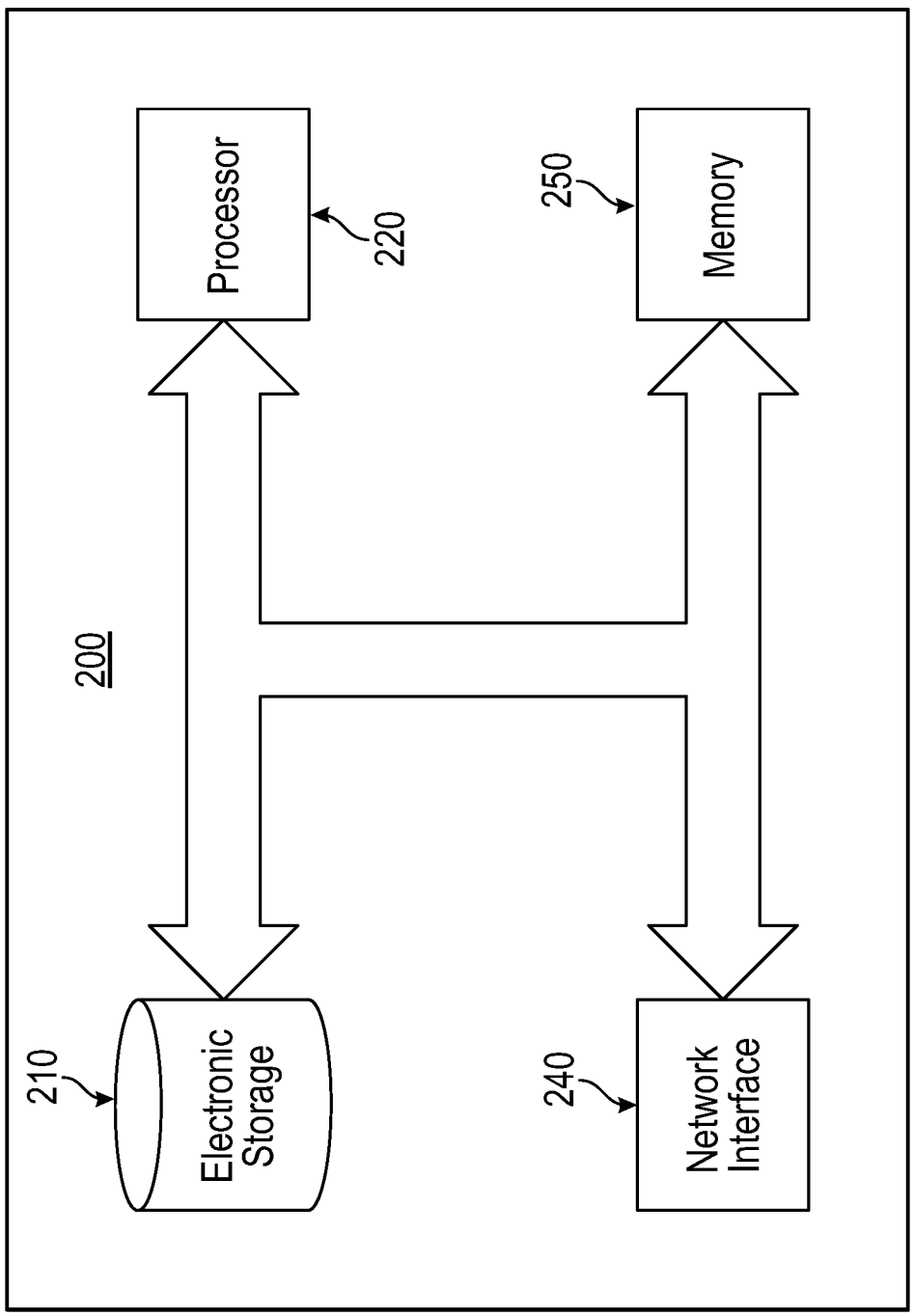
FIG. 2 is a block diagram of example components of the central system of FIG. 1, in accordance with aspects of the present disclosure.

Referring now to FIG. 2, there is shown a block diagram of example components of the central system 200 of FIG. 1. The central system 200 includes an electronic storage 210, a processor 220, a memory 250, and a network interface 240. The various components may be communicatively coupled with each other. The processor 220 may be any type of processor, such as a single-core central processing unit (CPU), a multi-core CPU, a System-on-Chip, or another type of processor. The memory 250 may be a volatile type of memory, e.g., RAM, or a non-volatile type of memory, e.g., NAND flash memory. The memory 250 includes computer-readable instructions that are executable by the processor 220 to cause the central system 200 to perform various operations, including the identity verification and access permission services mentioned above.

The electronic storage 210 may be and include any type of electronic storage used for storing data, such as hard disk drive, solid state drive, and/or optical disc, among other types of electronic storage. The electronic storage 210 stores software instructions for causing the central system 200 to perform its operations and stores data associated with such operations, such as the identify information and the access permissions described above. The electronic storage 210 may store information in a manner that satisfies information security standards and/or government regulations, such as SOC 2, GDPR, and/or ISO standards. The network interface 240 may implement technologies such as Ethernet, Wi-Fi, and/or cellular communications, among other communication technologies. The network interface 240 enables the central system 200 to communicate with other systems, such as client systems 130, 135 shown in FIG. 1, and/or communicate with other devices, such as user devices 110, 120, 140, 160 shown in FIG. 1.

The components shown in FIG. 2 are merely examples, and persons skilled in the art will understand that a central system 200 includes other components not illustrated and may include multiples of any of the illustrated components. Additionally, in various embodiments, the central system 200 may be implemented as a proprietary system, a distributed system, and/or a cloud system, or a combination of such systems. Such and other embodiments are contemplated to be within the scope of the present disclosure.

Figure 3:
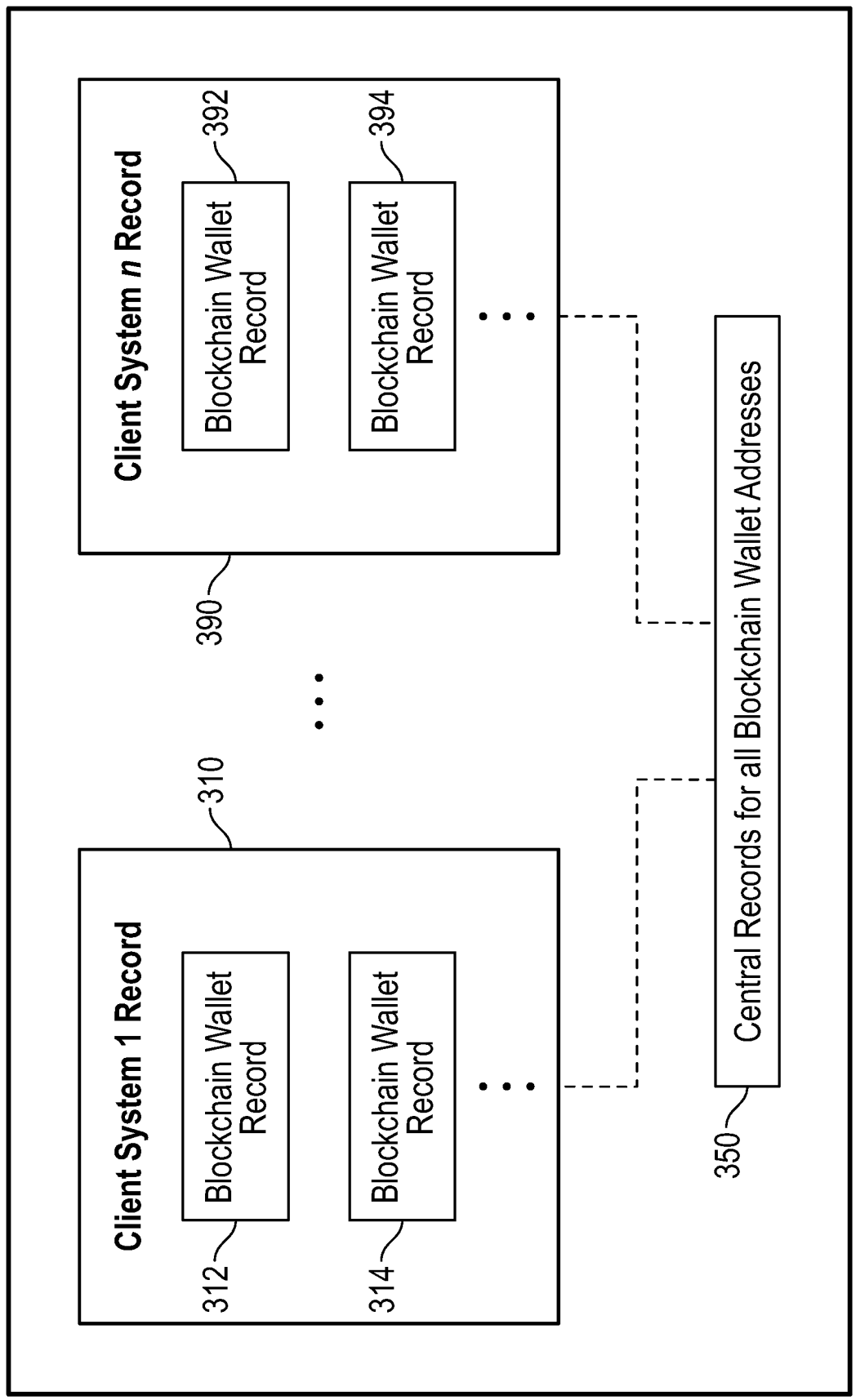
FIG. 3 is a block diagram of example data stored in the central system of FIG. 1, in accordance with aspects of the present disclosure.

FIG. 3 shows an example of data stored in the central system 200 of FIG. 1. As used herein, the term "record" means and includes organized data in which data elements are associated with each other according to a particular organization scheme. A record may be stored in a database or may be stored in electronic storage in other ways. The central system 200 can store a record for each client system serviced by it. Accordingly, if the central system 200 services a number n of client systems, the central system 200 can store a record 310 for client system 1, a record 390 for client system n, and a record for each client system between 1 and n. Each client system record can include a record for each blockchain wallet enrolled with the client system. The client system 1 record 310, for example, blockchain wallet records 312, 314 for blockchain wallets that are enrolled with client system 1, and the client system n record 390 includes blockchain wallet records 392, 394 for blockchain wallets that are enrolled with client system n. Other client system records (not shown) include blockchain wallet records for blockchain wallets that are enrolled with those client systems.

The central system 200 also stores central records 350 for all blockchain wallet addresses 350 that are in the central system 200. A central record 350 allows a blockchain wallet addresses' information to be consistent across multiple client systems when the blockchain address is enrolled in multiple client systems. As described in connection with FIGS. 4 and 5 below, each client system record 310, 390 may link to the central records 350 to dynamically obtain a central verification status for the blockchain wallet addresses enrolled with the client system.

The data and records shown in FIG. 3 are merely examples, and variations are contemplated to be within the scope of the present disclosure. For example, in various embodiments, other information not shown in FIG. 3 may be included in client system records. In various embodiments, the information shown in FIG. 3 may be organized in a different way. Such and other embodiments and variations are contemplated to be within the scope of the present disclosure.

Figure 4:
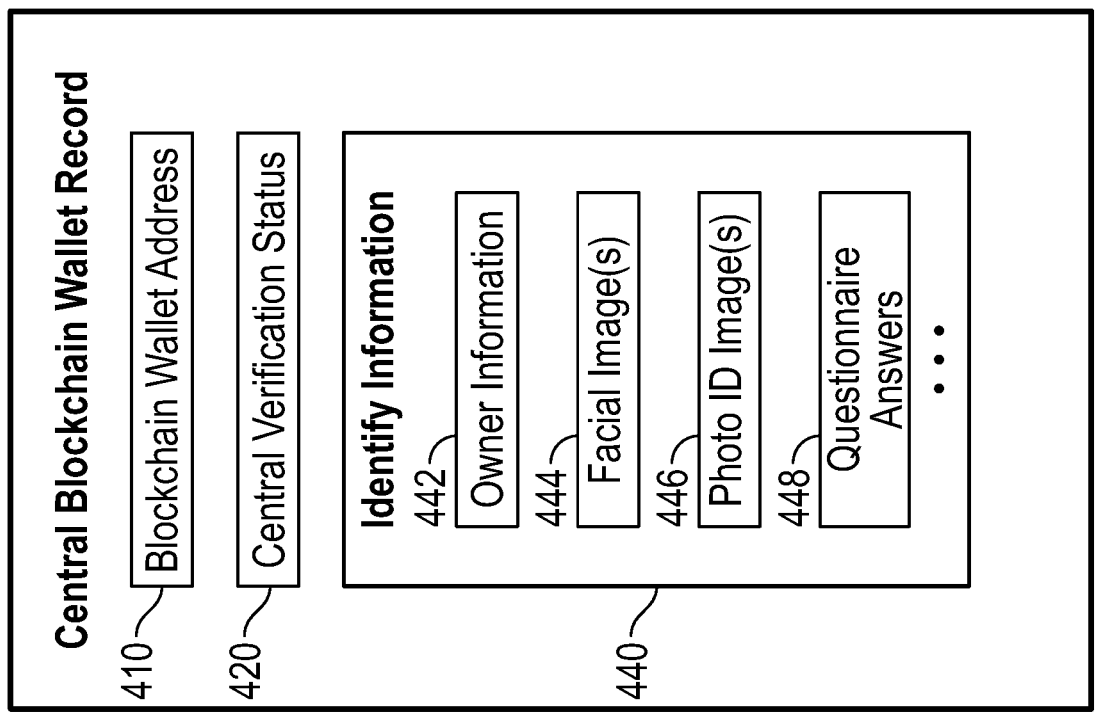
FIG. 4 is a block diagram of an example central blockchain wallet record, in accordance with aspects of the present disclosure.

FIG. 4 is an example of data that may be stored in a central blockchain wallet record of FIG. 3. The illustrated central blockchain wallet record includes a blockchain wallet address 410, a central verification status 420, and identity information 440. The blockchain wallet address 410 is an address that identifies a blockchain wallet and that reflects the public key of a blockchain wallet, as described above herein. A verification status 420 for a blockchain wallet address 410 is an indication of whether the identity of the owner of the blockchain wallet has been verified. The identity information 440 is information that has been collected by the central system 200 (FIG. 1) regarding the owner of the blockchain wallet. The illustrated identity information 440 includes owner information 442 (e.g., name, address, email address, telephone number, etc.), one or more facial images of the owner 444, image(s) of one or more photo IDs of the owner 446 (e.g., driver's license, passport, etc.), and/or questionnaire answers 448 provided by the owner during a verification process, among other possible identity information. In various embodiments, the identity information 440 may include more data than those shown, less data than those shown, or different data than those shown. In various embodiments, the identity information may be collected during a verification process, which will be described in connection with FIGS. 7 and 8 below. In various embodiments, the identity information 440 provides sufficient information to satisfy Know-Your-Customer (KYC) government regulations. The identity information 440 may be stored and handled in a manner that satisfies information security standards and government regulations, such as SOC 2, GDPR, and ISO standards.

The central verification status 420 may indicated a "verified" status or a "not verified" status. In accordance with aspects of the present disclosure, the verification status 420 may be determined by applying various criteria and/or processing to the identity information 440. For example, a criterion may require a certain number of information fields of the identity information 440 to be present. An example of processing that may be applied includes comparing the facial image(s) 444 to the facial image in the photo ID image 446 to determine whether they match. Another example of processing may include extracting the identification number from the photo ID image(s) 446 and checking various databases (e.g., Interpol databases, government sanctions databases, etc.) for negative information. A further example of processing may include obtaining audio/video answers 448 to the questionnaire to confirm that a live person is submitting the identity information 440, and/or may include tracking the location of the person submitting the identity information using, e.g., GPS location of a smartphone, Wi-Fi location determination, and/or IP tracking, among other tracking technologies. Other criteria and processing are contemplated and may be applied to the identity information to determine the verification status 420. If the criteria are satisfied, the central verification status 420 is set to a verified status. Otherwise, the central verification status is set to an unverified status. In various embodiments, a technician for the central system 200 may manually review identify information 440 that fails the verification process to check whether the central verification status 420 should be changed to verified status. In various embodiments, the verification status 420 may be reevaluated from time to time by reapplying the criteria and processing to the identity information 440.

Figure 5:
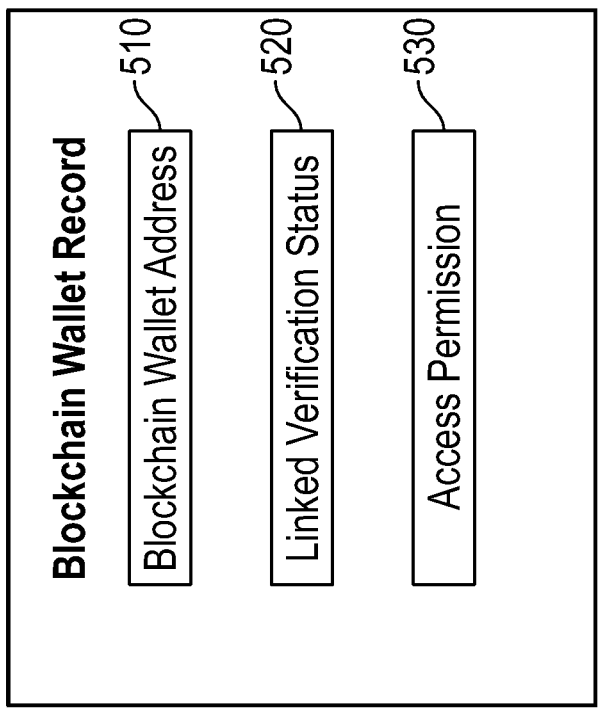
FIG. 5 is a block diagram of an example blockchain wallet record, in accordance with aspects of the present disclosure.

FIG. 5 is an example of data that may be stored in the blockchain wallet records of FIG. 3. The illustrated blockchain wallet record includes a blockchain wallet address 510, a linked verification status 520, and an access permission 530. The blockchain wallet address 510 is an address that identifies a blockchain wallet, as described above. The linked verification status 520 for a blockchain wallet address 510 is linked to the central verification status for the blockchain wallet address 510, which was described in connection with FIG. 4. For example, a blockchain wallet record may dynamically obtain the central verification status (420, FIG. 4) each time the blockchain wallet record is accessed.

As described in connection with FIG. 3, each blockchain wallet record is specific to a client system. In accordance with aspects of the present disclosure, and with continued reference to FIG. 5, the access permission 530 for the blockchain wallet record indicates whether the blockchain wallet address 510 is permitted or not permitted to access the client system associated with the blockchain wallet record. The access permission 530 may reflect an access granted status or may reflect an access denied status. The access permission 530 may be determined based on various criteria and/or rules. In various embodiments, the access permission 530 may be set to an access denied status whenever the linked verification status 530 has an unverified status and may be set to an access granted status whenever the linked verification status 530 has a verified status. In various embodiments, additional criteria or rules may be required for the access permission 530 to have an access granted status, such as criteria or rules that may be specific to a client system. In such embodiments, the central system 200 may maintain and automatically apply different criteria or/or rules for different client systems to determine, without human intervention, the access permission 530 of blockchain wallet records for different client systems. In various embodiments, the access permission 530 may be automatically reevaluated each time the blockchain wallet record is accessed.

Because a blockchain wallet address may be enrolled in multiple client systems, the blockchain wallet address may have multiple blockchain wallet records. As an example, referring again to FIG. 3, the blockchain wallet record 312 in the record 310 for client system 1 and the blockchain wallet record 392 in the record 390 for client system n may both have the same blockchain wallet address (510, FIG. 5) and the same linked verification status (520, FIG. 5). However, in the two blockchain wallet records 312, 392, the access permissions for the two records 312, 392 may be determined differently. Specifically, the access permission for blockchain wallet record 312 may rely on criteria and/or rules for client system 1 and the access permission for blockchain wallet record 392 may rely on different criteria and/or rules for client system n. In this scenario, it is possible for a blockchain wallet address to be verified in the central records 350 but to have different access permissions for central system 1 and central system n. This aspect of the present disclosure gives client systems flexibility in controlling the terms and conditions for granting access to their systems above and beyond relying simply on the central verification status.

The data and records of FIGS. 4 and 5 are merely examples, and variations are contemplated to be within the scope of the present disclosure. For example, in various embodiments, other information not shown in FIGS. 4 and 5 may be included in the records. In various embodiments, the information shown in FIGS. 4 and 5 may be organized in a different way. Such and other embodiments and variations are contemplated to be within the scope of the present disclosure.

Referring again to FIG. 1, the central system 200 allows administrators of the client systems 130, 135 to access certain information in the central system 200 for their systems. FIG. 6 shows an example of a client portal application screen that a client system administrator may access. The screen may be accessed by a client system administrator via an application on any of the user devices 110, 120, 140, 160 of FIG. 1. The screen shows that the client system has eight connected wallets 610, among which five wallets are verified 620. The screen also shows that the client system has five administrators 630. In accordance with aspects of the present disclosure, and as shown in panel 640, each client system administrator is identified by a blockchain wallet address belonging to the client system administrator. Panel 640 shows that three client system administrators have verified status and two client system administrators are unverified. In various embodiments, the central system 200 may or may not require client system administrators to be verified in the same way as other blockchain wallet addresses in the client system. The illustrated screen of FIG. 6 is merely an example and does not limit the screens and information accessible to a client system administrator. In various embodiments, however, a client system administrator may not access any identifying information (440, FIG. 4) for a blockchain wallet address. Other screens and information are contemplated to be within the scope of the present disclosure.

The following paragraphs will now describe an example process for users of a client system to become verified. Referring again to FIG. 1, users may use devices 110, 120, 140, 160 to access the client systems 130, 135 and enroll their blockchain wallet addresses.

Figure 7:
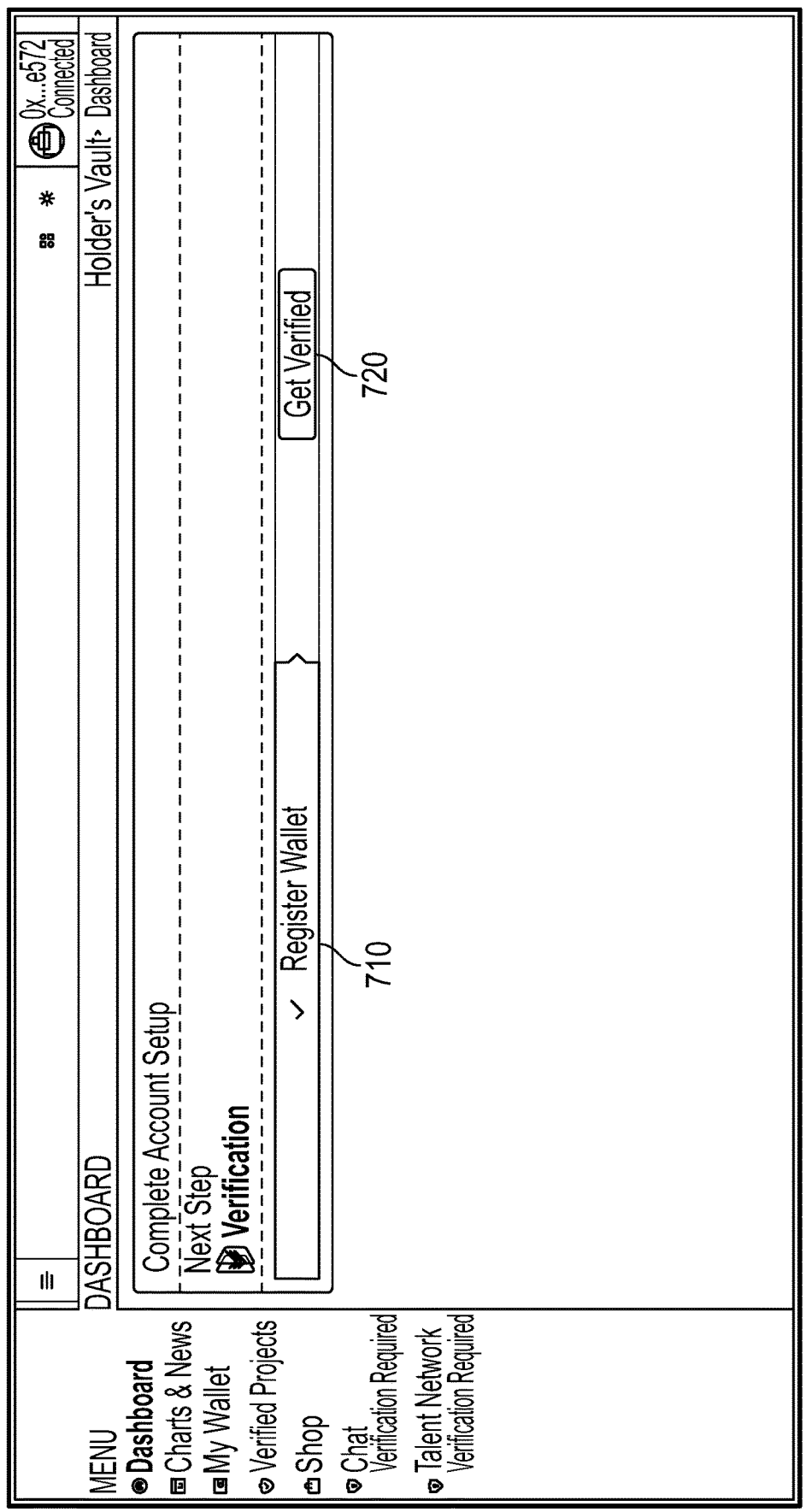
FIG. 7 is a diagram of an example account creation screen accessible by a user of a client system, in accordance with aspects of the present disclosure.

FIG. 7 shows an example account setup application screen for a client system. The screen may be accessed via an application on any of the user devices 110, 120, 140, 160 of FIG. 1. The screen indicates that a wallet has been registered 710 and includes a button 720 that can be selected to "Get Verified." In accordance with aspects of the present disclosure, the button 720 implements a link to the central system 200 and, when selected, redirects the user device to a screen of the central system 200, such as the example screen shown in FIG. 8. The link to the central system 200 for the button 720 may be implemented using an application programming interface for the central system 200, which persons skilled in the art will understand how to implement. In various embodiments, the link may be implemented in as few as three lines of code, as persons skilled in the art will understand.

Using the example screen of FIG. 8, a user may verify a blockchain wallet address with the central system 200 for a client system by providing identity information such as the identity information 440 described in connection with FIG. 4. The central system 200 may prompt the user device to access its camera to capture one or more facial images, to upload photo ID images, and/or to have a user enter owner information and/or answer a questionnaire, among other things described in connection with FIG. 4. The central system 200 may then create a central blockchain wallet record in accordance with FIG. 4, create a blockchain wallet record in accordance with FIG. 5, and associate the records with a client system in accordance with FIG. 3. After the verification is completed, the central system 200 may redirect the user device back to the client system, which may then query the central system 200 to confirm that the blockchain wallet address is verified. If the central system 200 responds to the client system with a confirmation that the blockchain wallet address is verified, the client system may reflect this verification status in an application screen, such as the example screen shown in FIG. 9. The query and response may be implemented using an application programming interface for the central system 200, which persons skilled in the art will understand how to implement.

Figure 9:
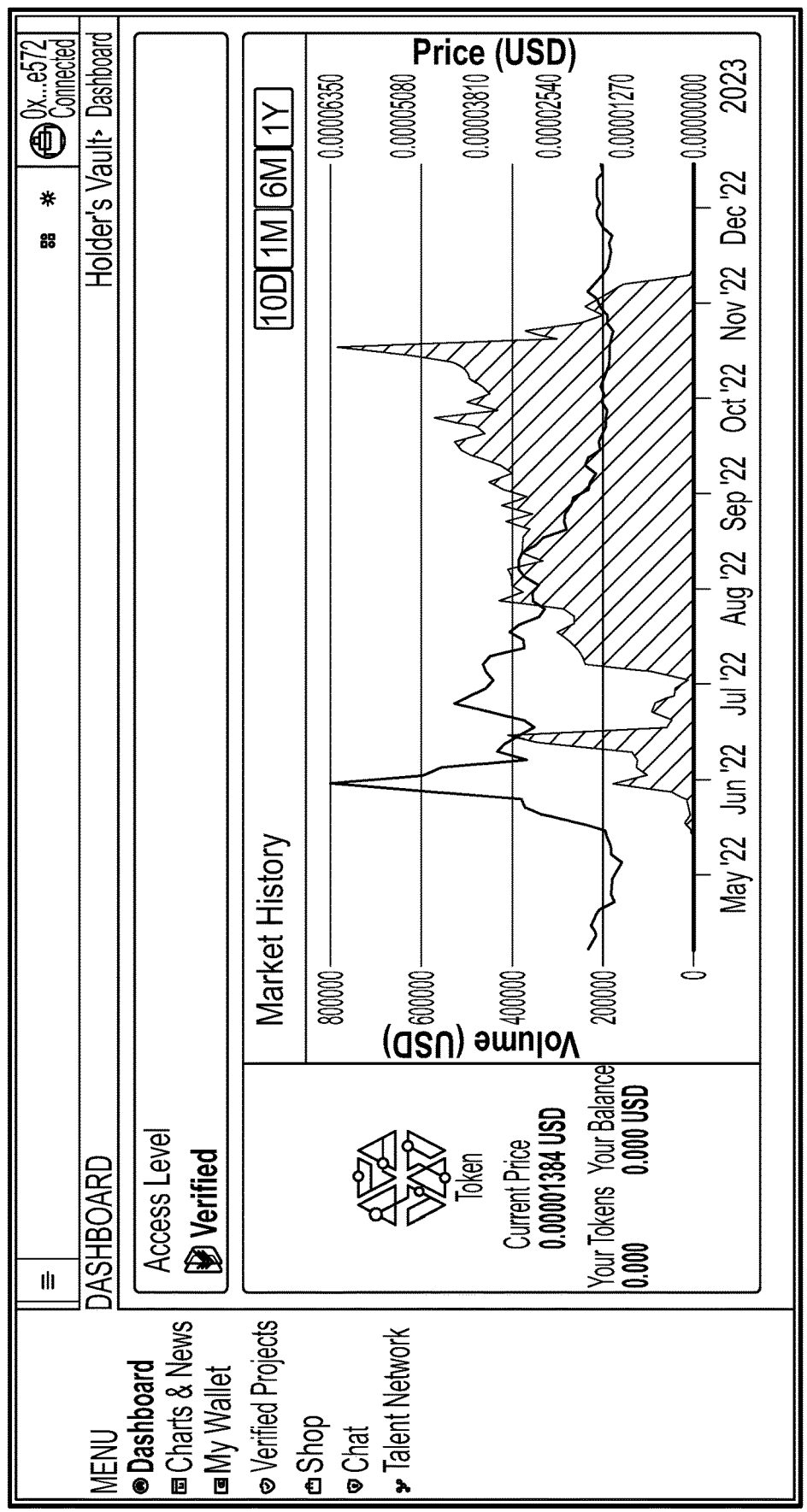
FIG. 9 is a diagram of an example application screen accessible by a verified user of a client system, in accordance with aspects of the present disclosure.

The screens of FIGS. 7-9 are merely examples and do not limit the types of applications screens that may be displayed. Other screens are contemplated to be within the scope of the present disclosure.

Figure 10:
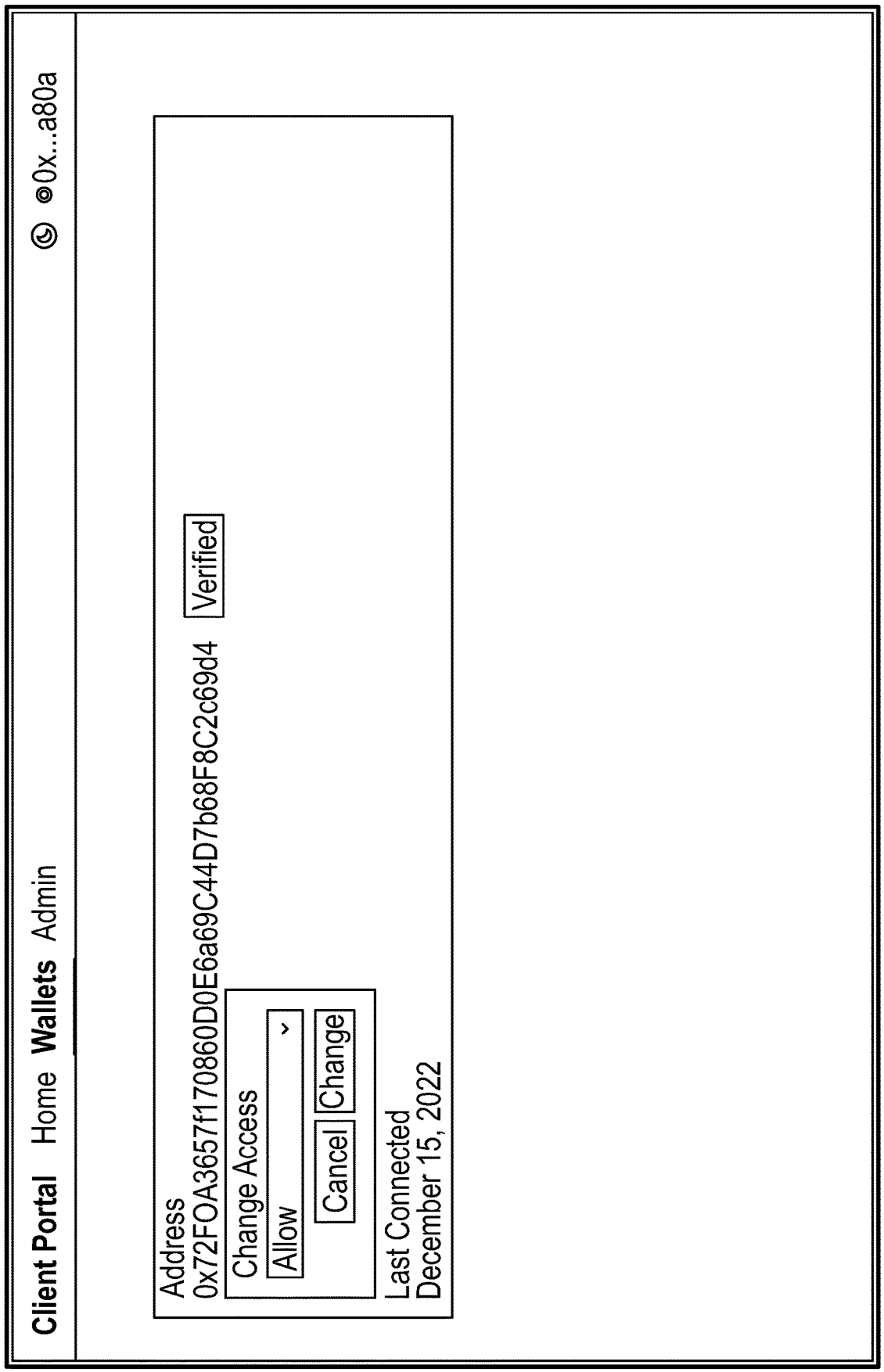
FIG. 10 is a diagram of an example screen accessible by a client system administrator for manually setting an access permission for a blockchain wallet address, in accordance with aspects of the present disclosure.
Figure 11:
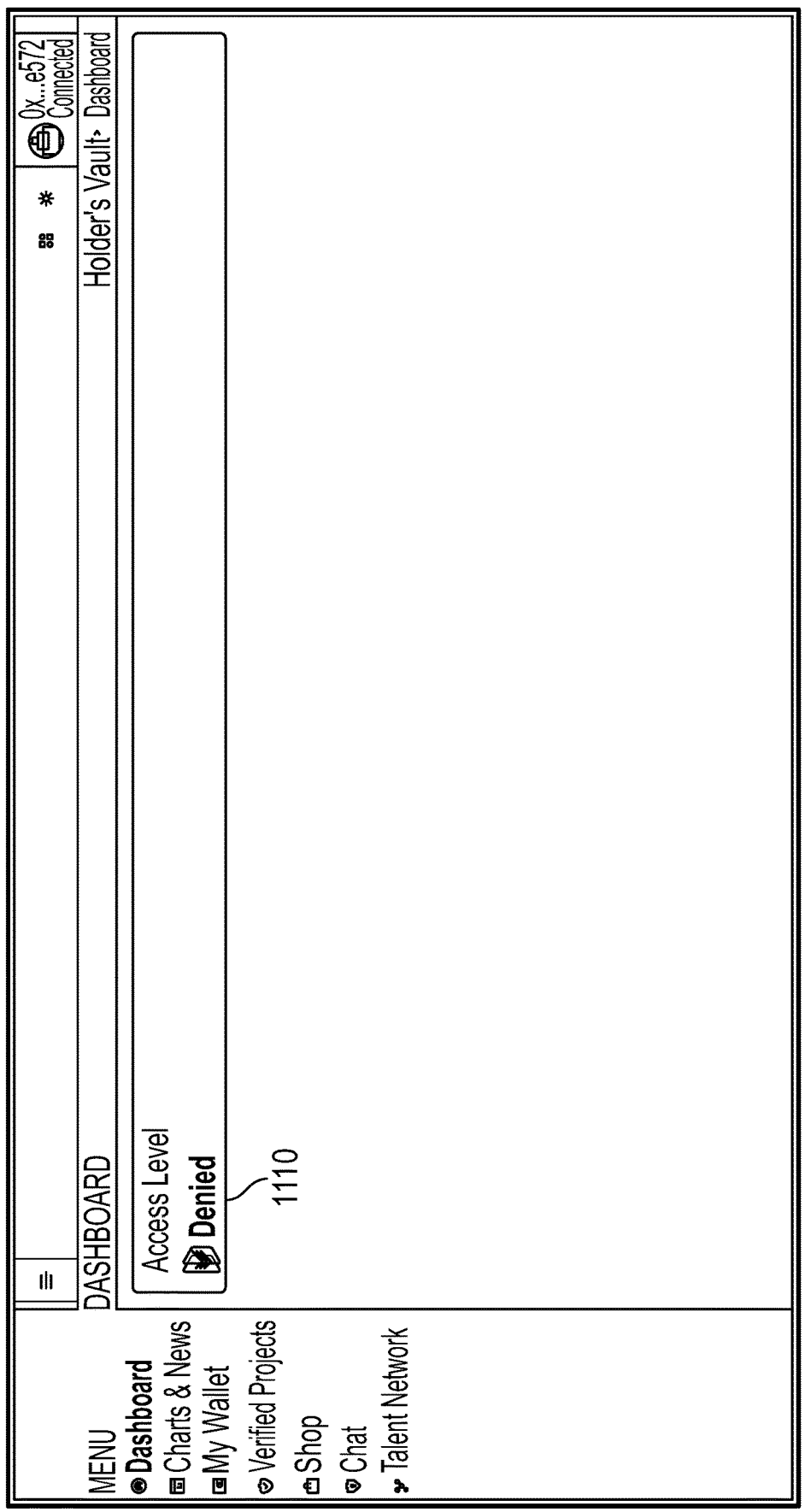
FIG. 11 is a diagram of an example screen accessible by a user of a client system whose access permission has a denied status, in accordance with aspects of the present disclosure.

The following paragraphs describe, in connection with FIGS. 10 and 11, an ability for a client system administrator to manually change the access permission for a blockchain wallet address. As described above in connection with FIG. 5, each blockchain wallet record for a client system includes an access permission 530, and criteria and rules may be used by the central system 200 to automatically determine the access permission 530 without human intervention.

In accordance with aspects of the present disclosure, the central system 200 may permit a client system administrator to manually change or set the access permission for a blockchain wallet address. FIG. 10 shows an example application screen of the central system 200 that may be accessed by a client system administrator. As shown in FIG. 10, even when the blockchain wallet address is verified, a client system administrator may be permitted to change the access permission to deny access. In various embodiments, a client system administrator may be permitted to manually change the access permission of an unverified blockchain wallet address to an access granted status. In various embodiments, a client system administrator may not be permitted to manually change the access permission of an unverified blockchain wallet address to an access granted status.

FIG. 11 shows an example application screen of a client system that can be accessed by a user of the client system where access permission has been denied. As described above, a client system may query the central system 200 for the access permission for a blockchain wallet address. If the central system 200 responds with an access denied status, the application screen may reflect this status 1110 and prevent a user from accessing various features and/or portions of the client system. The query and response may be implemented using an application programming interface for the central system 200, which persons skilled in the art will understand how to implement.

Accordingly, various operations of a central system, of client systems, and of user devices have been described above. In aspects of the present disclosure, the central system (200, FIG. 2) may track and timestamp all activity and transactions engaged in the central system. The central system may store information in a manner that satisfies information security standards and/or government regulations, such as SOC 2, GDPR, and/or ISO standards. The central system verifies the identities of blockchain wallet owners in a manner that protects the personal information of blockchain wallet owners while providing a degree of assurance to service or platform providers that the identities of blockchain wallet owners have been verified. Additionally, aspects of the present disclosure maintain a separate access permission for each blockchain wallet for each provider, such that a blockchain wallet may be granted access to one provider but denied access to another provider, even if the owner identity for the blockchain wallet is verified. The technology of the present disclosure may enable service or platform providers to meet Know-Your-Customer(KYC) government regulations without verifying identity information by themselves.

Figure 12:
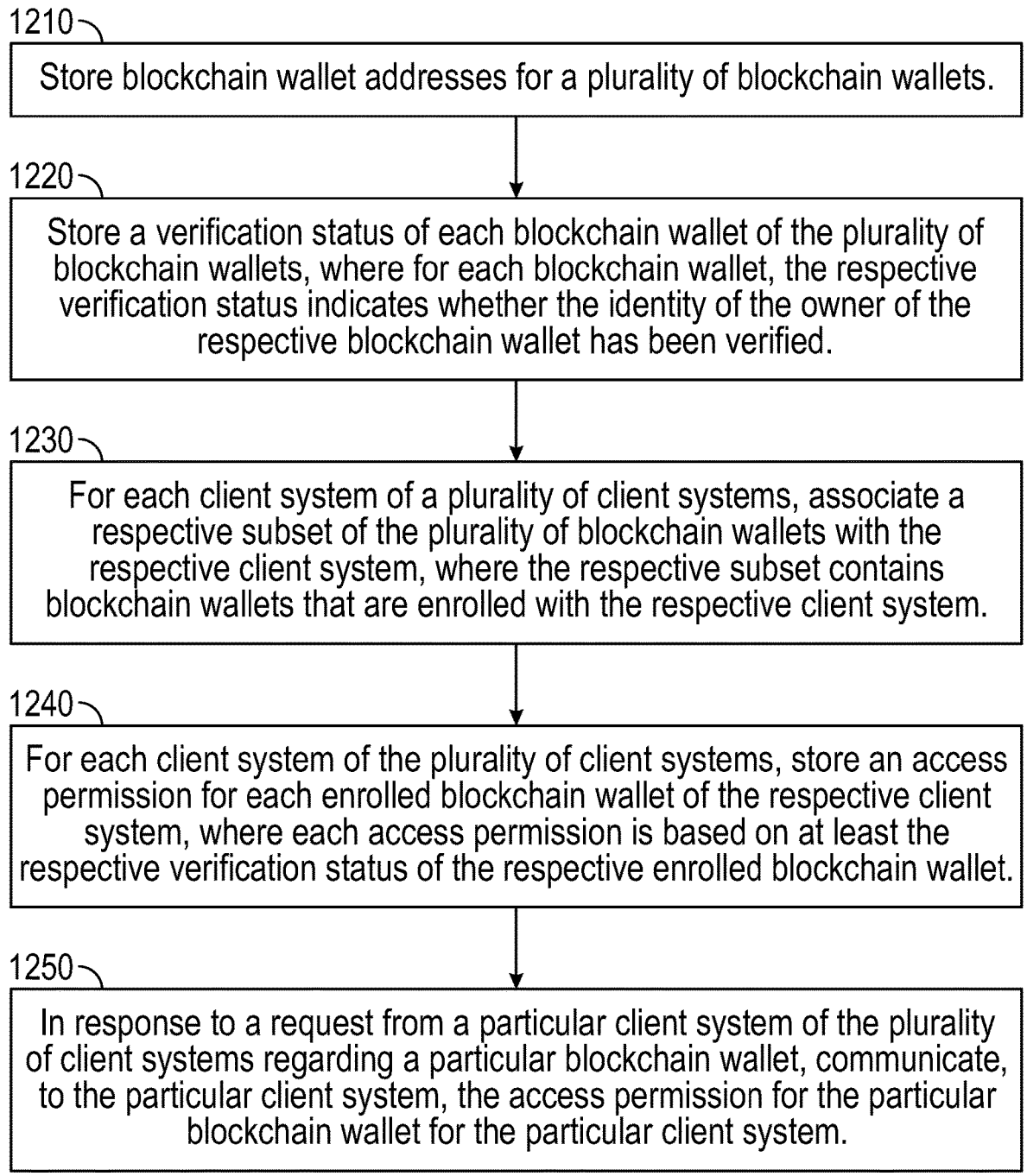
FIG. 12 is a flow diagram of example operations of the central system, in accordance with aspects of the present disclosure.

FIG. 12 shows an example of various operations of the central system. The operations may be implemented by software instruction and may be performed by one or more processors executing instructions in the central system.

At block 1210, the operations involve storing blockchain wallet addresses for a plurality of blockchain wallets. The blockchain wallet addresses may be stored in central blockchain wallet address records, as described in connection with FIG. 4.

At block 1220, the operations involve storing a verification status of each blockchain wallet of the plurality of blockchain wallets. For each blockchain wallet, the respective verification status indicates whether the identity of the owner of the respective blockchain wallet has been verified. The verification status may be the central verification status described in connection with FIG. 4, which may be determined as described in connection with FIG. 4.

At block 1230, the operations involve, for each client system of a plurality of client systems serviced by the central system, associating a respective subset of the plurality of blockchain wallets with the respective client system, where the respective subset contains blockchain wallets that are enrolled with the respective client system. This operation involves, for example, creating the client system records and the blockchain wallet records described in connection with FIG. 3 and FIG. 5.

At block 1240, the operations involve, for each client system of the plurality of client systems, storing an access permission for each enrolled blockchain wallet of the respective client system, where each access permission is based on at least the respective verification status of the respective enrolled blockchain wallet. This operation involves, for example, determining the access permissions for each blockchain wallet record, as described in connection with FIG. 5.

At block 1250, the operations involve, in response to a request from a particular client system of the plurality of client systems regarding a particular blockchain wallet, communicate, to the particular client system, the access permission for the particular blockchain wallet for the particular client system. As described herein, a client system may permit a user to user various features or deny a user from using various features based on the access permission for the user's blockchain wallet address for the client system.

The operations of FIG. 12 are merely examples, and a central system may perform more operations, fewer operations, and/or different operations than those shown. Such variations are contemplated to be within the scope of the present disclosure.

The aspects, embodiments, and examples disclosed herein are examples of the disclosure and may be embodied in various forms. For instance, although certain aspects, embodiments, and examples herein are described as separate, each of the aspects, embodiments, and examples herein may be combined with one or more of the other aspects, embodiments, or examples herein. Specific structural and functional details disclosed herein are not to be interpreted as limiting, but as a basis for the claims and as a representative basis for teaching one skilled in the art to variously employ this disclosure in virtually any appropriately detailed structure.

The phrases "in an aspect," "in aspects," "in various aspects," "in some aspects," or "in other aspects" may each refer to one or more of the same or different aspects in accordance with this disclosure. The phrase "a plurality of" may refer to two or more.

The phrases "in an embodiment," "in embodiments," "in various embodiments," "in some embodiments," or "in other embodiments" may each refer to one or more of the same or different embodiments in accordance with the present disclosure. A phrase in the form "A or B" means "(A), (B), or (A and B)." A phrase in the form "at least one of A, B, or C" means "(A); (B); (C); (A and B); (A and C); (B and C); or (A, B, and C)."

Any of the herein described methods, programs, algorithms or codes may be converted to, or expressed in, a programming language or computer program. The terms "programming language" and "computer program," as used herein, each include any language used to specify instructions to a computer, and include (but are not limited to) the following languages and their derivatives: Assembler, Basic, Batch files, BCPL, C, C+, C++, Delphi, Fortran, Java, JavaScript, machine code, operating system command languages, Pascal, Perl, PL1, Python, scripting languages, Visual Basic, metalanguages which themselves specify programs, and all first, second, third, fourth, fifth, or further generation computer languages. Also included are database and other data schemas, and any other meta-languages. No distinction is made between languages which are interpreted, compiled, or use both compiled and interpreted approaches. No distinction is made between compiled and source versions of a program. Thus, reference to a program, where the programming language could exist in more than one state (such as source, compiled, object, or linked) is a reference to any and all such states. Reference to a program may encompass the actual instructions and/or the intent of those instructions.

It should be understood that the foregoing description is only illustrative of the present disclosure. Various alternatives and modifications can be devised by those skilled in the art without departing from the disclosure. Accordingly, the present disclosure is intended to embrace all such alternatives, modifications and variances. The embodiments described with reference to the attached drawing figures are presented only to demonstrate certain examples of the disclosure. Other elements, steps, methods, and techniques that are insubstantially different from those described above and/or in the appended claims are also intended to be within the scope of the disclosure.

What is claimed is:

1. A central system comprising:
   one or more electronic storage;
   one or more processors; and
   at least one memory storing instructions which, when executed by the one or more processors, cause the central system to:
   store, in the one or more electronic storage, blockchain wallet addresses for a plurality of blockchain wallets;
   store, in the one or more electronic storage, a verification status of each blockchain wallet of the plurality of blockchain wallets, wherein for each blockchain wallet of the plurality of blockchain wallets, the respective verification status indicates whether identity of an owner of the respective blockchain wallet has been verified;
   provide access management for a plurality of client systems,
   wherein the verification status of a particular blockchain wallet of the plurality of blockchain wallets indicates that the identity of the owner of the particular blockchain wallet has been verified; and
   permit a client administrator of the respective client system to manually set access permission for any enrolled blockchain wallet of the respective subset for the respective client system to a denied state,
   wherein for a first client system among the plurality of client systems, the access permission for the particular blockchain wallet for the first client system indicates that access is granted, and wherein for a second client system among the plurality of client systems, the access permission for the particular blockchain wallet for the second client system indicates that access is denied.

2. The central system of claim 1, wherein in the providing the access management, the instructions, when executed by the one or more processors, further cause the central system, for each client system of the plurality of client systems to:

associate a respective subset of the plurality of blockchain wallets with the respective client system, the respective subset containing blockchain wallets of the plurality of blockchain wallets that are enrolled with the respective client system;

store, in the one or more electronic storage, the access permission for each enrolled blockchain wallet of the respective subset for the respective client system, wherein each access permission is based on at least the respective verification status of the respective enrolled blockchain wallet; and in response to a request from a particular client system of the plurality of client systems regarding the particular blockchain wallet of the plurality of blockchain wallets, communicate, to the particular client system, the access permission for the particular blockchain wallet for the particular client system.

3. The central system of claim 1, wherein in the providing the access management, the instructions, when executed by the one or more processors, further cause the central system to:

receive a concurrent request from the first client system regarding the particular blockchain wallet and a concurrent request from the second client system regarding the particular blockchain wallet;

in response to the concurrent request from the first client system regarding the particular blockchain wallet, communicate, to the first client system, that access is granted; and in response to the concurrent request from the second client system regarding the particular blockchain wallet, communicate, to the second client system, that access is denied.

4. The central system of claim 2, wherein in the providing the access management, the instructions, when executed by the one or more processors, further cause the central system to, for each client system of the plurality of client systems:

automatically set, based on respective configurable criteria for the respective client system and without human intervention, the access permission for any enrolled blockchain wallet of the respective subset for the respective client system.

5. A computer-implemented method comprising:

storing, in one or more electronic storage, blockchain wallet addresses for a plurality of blockchain wallets;

storing, in the one or more electronic storage, a verification status of each blockchain wallet of the plurality of blockchain wallets, wherein for each blockchain wallet of the plurality of blockchain wallets, the respective verification status indicates whether identity of an owner of the respective blockchain wallet has been verified;

providing access management for a plurality of client systems; and permitting a client administrator of the respective client system to manually set access permission for any enrolled blockchain wallet of the respective subset for the respective client system to a denied state, wherein the verification status of a particular blockchain wallet of the plurality of blockchain wallets indicates that the identity of the owner of the particular blockchain wallet has been verified, wherein for a first client system among the plurality of client systems, the access permission for the particular blockchain wallet for the first client system indicates that access is granted, and wherein for a second client system among the plurality of client systems, the access permission for the particular blockchain wallet for the second client system indicates that access is denied.

6. The computer-implemented method of claim 5, wherein the providing the access management comprises:

for each client system of the plurality of client systems:

associating a respective subset of the plurality of blockchain wallets with the respective client system, the respective subset containing blockchain wallets of the plurality of blockchain wallets that are enrolled with the respective client system, and storing, in the one or more electronic storage, the access permission for each enrolled blockchain wallet of the respective subset for the respective client system, wherein each access permission is based on at least the respective verification status of the respective enrolled blockchain wallet; and in response to a request from a particular client system of the plurality of client systems regarding the particular blockchain wallet of the plurality of blockchain wallets, communicating, to the particular client system, the access permission for the particular blockchain wallet for the particular client system.

7. The computer-implemented method of claim 5, wherein the providing the access management comprises:

receiving a concurrent request from the first client system regarding the particular blockchain wallet and a concurrent request from the second client system regarding the particular blockchain wallet;

in response to the concurrent request from the first client system regarding the particular blockchain wallet, communicating, to the first client system, that access is granted; and in response to the concurrent request from the second client system regarding the particular blockchain wallet, communicating, to the second client system, that access is denied.

8. The computer-implemented method of claim 6, wherein the providing the access management comprises, for each client system of the plurality of client systems:

automatically setting, based on respective configurable criteria for the respective client system and without human intervention, the access permission for any enrolled blockchain wallet of the respective subset for the respective client system.

9. A non-transitory computer-readable medium storing instructions which, when executed by one or more processors of a central system, causes the central system to:

store, in one or more electronic storage, blockchain wallet addresses for a plurality of blockchain wallets;

store, in the one or more electronic storage, a verification status of each blockchain wallet of the plurality of blockchain wallets, wherein for each blockchain wallet of the plurality of blockchain wallets, the respective verification status indicates whether identity of an owner of the respective blockchain wallet has been verified;

provide access management for a plurality of client systems; and permitting a client administrator of the respective client system to manually set access permission for any enrolled blockchain wallet of the respective subset for the respective client system to a denied state, wherein the verification status of a particular blockchain wallet of the plurality of blockchain wallets indicates that the identity of the owner of the particular blockchain wallet has been verified, wherein for a first client system among the plurality of client systems, the access permission for the particular blockchain wallet for the first client system indicates that access is granted, and wherein for a second client system among the plurality of client systems, the access permission for the particular blockchain wallet for the second client system indicates that access is denied.

10. The non-transitory computer-readable medium of claim 9, wherein in the providing the access management, the instructions, when executed by the one or more processors, cause the central system to:

for each client system of the plurality of client systems:
associating a respective subset of the plurality of blockchain wallets with the respective client system, the respective subset containing blockchain wallets of the plurality of blockchain wallets that are enrolled with the respective client system, and storing, in the one or more electronic storage, the access permission for each enrolled blockchain wallet of the respective subset for the respective client system, wherein each access permission is based on at least the respective verification status of the respective enrolled blockchain wallet; and in response to a request from a particular client system of the plurality of client systems regarding the particular blockchain wallet of the plurality of blockchain wallets, communicate, to the particular client system, the access permission for the particular blockchain wallet for the particular client system.

11. The non-transitory computer-readable medium of claim 9, wherein in the providing the access management, the instructions, when executed by the one or more processors, cause the central system to:

receive a concurrent request from the first client system regarding the particular blockchain wallet and a concurrent request from the second client system regarding the particular blockchain wallet;

in response to the concurrent request from the first client system regarding the particular blockchain wallet, communicate, to the first client system, that access is granted; and in response to the concurrent request from the second client system regarding the particular blockchain wallet, communicate, to the second client system, that access is denied.

12. The non-transitory computer-readable medium of claim 10, wherein in the providing the access management, the instructions, when executed by the one or more processors, cause the central system to, for each client system of the plurality of client systems:

automatically set, based on respective configurable criteria for the respective client system and without human intervention, the access permission for any enrolled blockchain wallet of the respective subset for the respective client system.

* * * * *